United States Patent
Wunderlich, Jr. et al.

(10) Patent No.: US 9,772,862 B2
(45) Date of Patent: Sep. 26, 2017

(54) INTEGRATION PROJECT CENTER

(71) Applicant: ORACLE INTERNATIONAL CORPORATION, Redwood Shores, CA (US)

(72) Inventors: Robert David Wunderlich, Jr., Winter Park, FL (US); Munazza Bukhari, San Carlos, CA (US); Avi Borthakur, Belmont, CA (US); Prabhu Thukkaram, San Ramon, CA (US); Simone Geib, San Francisco, CA (US); Hari Gandhi, Orlando, FL (US); Rajan M Modi, Highlands Ranch, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/761,660

(22) Filed: Feb. 7, 2013

(65) Prior Publication Data

US 2014/0223408 A1 Aug. 7, 2014

(51) Int. Cl.
G06F 9/44 (2006.01)

(52) U.S. Cl.
CPC .............. *G06F 9/4446* (2013.01); *G06F 8/36* (2013.01)

(58) Field of Classification Search
CPC .................................. G06F 9/4446; G06F 8/36
See application file for complete search history.

(56) References Cited

U.S. PATENT DOCUMENTS

| | | | |
|---|---|---|---|
| 2008/0189679 A1* | 8/2008 | Rodriguez | G06F 8/34 717/105 |
| 2010/0030890 A1* | 2/2010 | Dutta et al. | 709/224 |
| 2010/0036665 A1* | 2/2010 | Bess | G06F 8/38 704/251 |
| 2011/0010217 A1* | 1/2011 | Arni et al. | 705/8 |
| 2011/0161913 A1* | 6/2011 | Garimella et al. | 717/101 |

* cited by examiner

Primary Examiner — Li B Zhen
Assistant Examiner — Amir Soltanzadeh
(74) Attorney, Agent, or Firm — Kilpatrick Townsend & Stockton LLP (57) ABSTRACT

Embodiments of the present invention provide for supporting definition of services in the SOA using templates for definition of processes, tasks, and/or components and wizards associated to the templates for guiding users in defining values to variables in the templates. Embodiments of the present invention provide developers with a guided flow for an integration project as well as guidance from the functional decomposition from the solution architect within an integrated development environment. Embodiments provide pre-built templates that may also contain wizard based interfaces to help the developers to create services that follow best-practices and include necessary plumbing tasks. Embodiments described herein provide the ability to create and save BPEL projects and scopes as templates to be reused in later projects and the application of these template features with wizard interfaces and a project overview/checklist model to provide developer guidance and assistance in creating the service that follows best-practices.

23 Claims, 7 Drawing Sheets

INTEGRATION PROJECT CENTER

BACKGROUND OF THE INVENTION

Embodiments of the present invention relate generally to methods and systems for supporting definition of services in a Service Oriented Architecture (SOA) and more particularly to supporting definition of services in the SOA using templates for definition of processes, tasks, and/or components and wizards associated to the templates for guiding users in defining values to variables in the templates.

A Service Oriented Architecture (SOA) is a system, i.e., hardware, software, or a combination of hardware and software, providing services or business processes built upon sets of reusable components, e.g., software code, data structures, etc. When constructing or implementing such services, SOA integration projects range from the very simple connection between two edge systems to large-scale business flows between many edge systems that result in collections of service artifacts. To combat technical debt, organizations seek to build reusable components in the hopes that as requirements evolve, services that are already created, can be used in future integration scenarios. This is typically one of the motivating factors to choose a canonical integration style. These large-scale integration projects typically involve multiple teams across an expertise. For example, if a business flow involves multiple different applications, there may be development teams from each application as well as one or more teams driving the overall integration project.

In such projects, the Integration developers are faced with three main challenges. First, the developers should understand the requirements, i.e., what has to be built. A solution architect typically provides a functional design document that describes the requirements and may provide a functional decomposition of the system services that may be required. This functional decomposition typically does not have the technical implementation details, but could be quite granular. Second, the developers should understand the best practices, i.e., how it should be built. Technical debt is created by code that may solve an immediate requirement, but may do so with unintended implications, such as for example, failure to employ an error handling strategy. While the code may do well in a unit test, it might not provide for operational management when put into production. Third, the developers should be completing repetitive tasks to comply with these best practices. For example, following specific naming conventions, creating appropriate scopes, adding error-handling branches etc. are steps that may be documented but can be tedious for the developer to code for each scope. Some of the solutions that the industry has offered are primarily built around documentation of patterns and best practices. However, such solutions still require a thorough understanding of the requirements and best practices by the developers and rely on then to consistently implement the processes accordingly. Hence, there is a need for improved methods and systems for supporting definition of services in a Service Oriented Architecture (SOA).

BRIEF SUMMARY OF THE INVENTION

Embodiments of the invention provide systems and methods for supporting definition of services in a Service Oriented Architecture (SOA). According to one embodiment, supporting definition of a service in a SOA can comprise defining a plurality of templates. Each template can comprise code defining a process, a task, or a component available for use in one or more services. The code can include one or more variables. One or more wizards can also be defined. Each wizard can comprise a routine presenting a defined interface and directing definition of values for variables within one or more of the plurality of templates. The one or more wizards can be associated with one or more of the plurality of templates.

The variables of the selected template can be filled with values collected through the defined interface of the invoked wizard and based on the routine of the invoked wizard. The code of the template can be updated with the filled variable values and updated code of the template can be inserted into code for the definition of the service. The code for the definition of the service including the inserted updated code of the template can be presented to a user of the development environment.

At runtime of a development environment a selection of a template of the plurality of templates can be received, the selection indicating use of the template in the definition of the service. A determination can be made as to whether the selected template is associated with a wizard of the one or more wizards. In response to determining the selected template is associated with a wizard of the one or more wizards, the associated wizard can be invoked. In response to determining the selected template is not associated with a wizard of the one or more wizards, the code of the selected template can be inserted into code for the definition of the service. The code for the definition of the service including the inserted code of the template can be present to a user of the development environment.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for supporting definition of services in a Service Oriented Architecture (SOA). More specifically, embodiments of the present invention provide for supporting definition of services in the SOA using templates for definition of processes, tasks, and/or components and wizards associated to the templates for guiding users in defining values to variables in the templates. Embodiments of the present invention provide developers with a guided flow for an integration project as well as guidance from the functional decomposition from the solution architect within an integrated development environment. Embodiments provide pre-built templates that may also contain wizard based interfaces to help the developers to create services that follow best-practices and include necessary plumbing tasks. Embodiments described herein provide the ability to create and save BPEL projects and scopes as templates to be reused in later projects and the application of these template features with wizard interfaces and a project overview/checklist model to provide developer guidance and assistance in creating the service that follows best-practices.

As such, embodiments of the present invention can lay out the phases of the development project and provide guidance as well as tool linking throughout the project. An example of this is later in the development lifecycle where the developer would run a code-compliance engine. A checklist model can be provided by embodiments of the present invention which can detail this as a phase and provide a launch button to invoke that tool. Embodiments described herein promote governance by helping the developers to consistently create projects that follow recognized best-practice patterns. Using these embodiments, integration developers of varying expertise levels can obtain as much or as little guidance as needed, based on both the overall approach to developing an integration project and the requirements provided by the solution architect. Using the template functionality, developers can generate components of code more quickly and consistently. Various additional details of embodiments of the present invention will be described below with reference to the figures.

Figure 1:
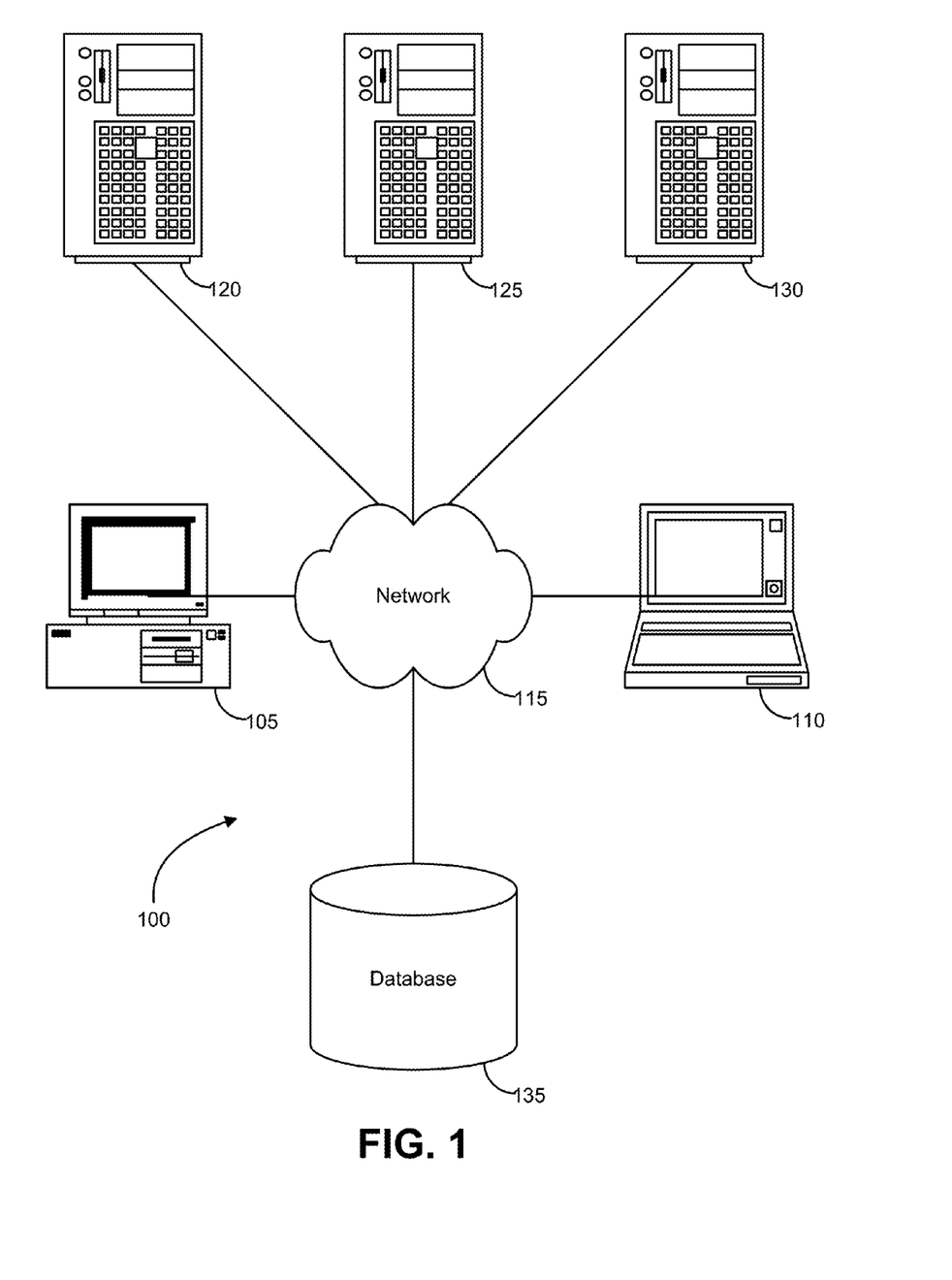
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 11g, that is adapted to store, update, and retrieve data in response to SQL-formatted commands.

Figure 2:
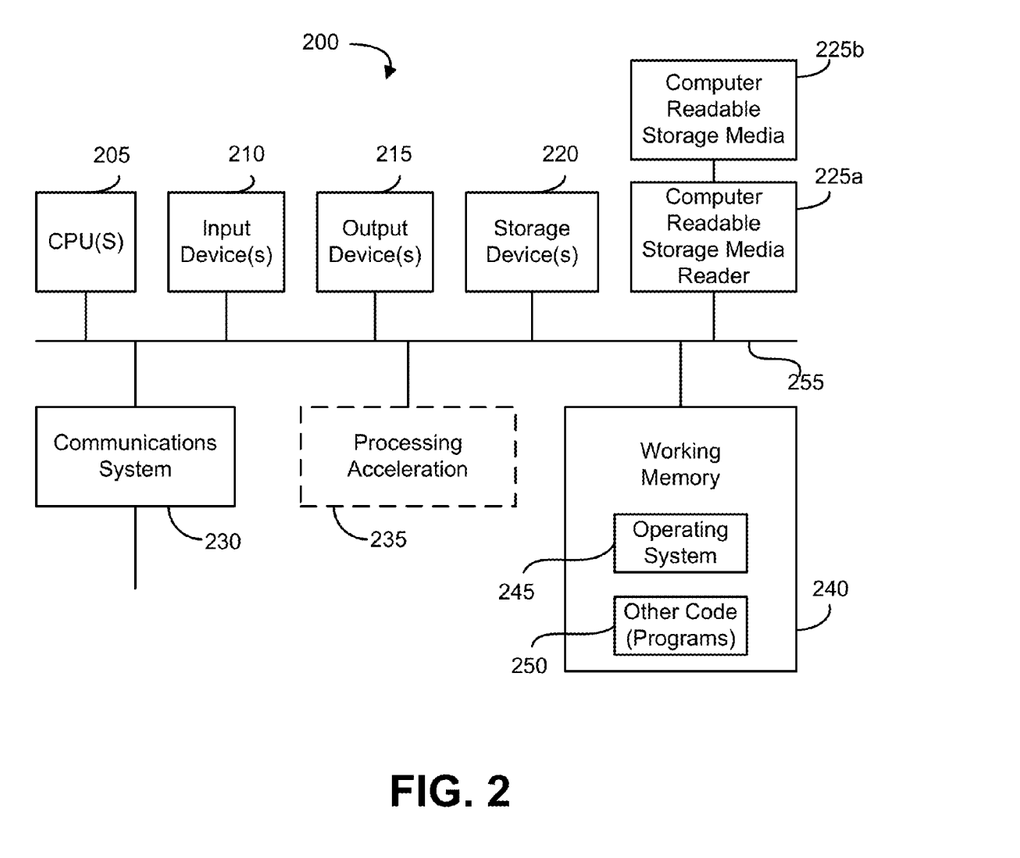
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
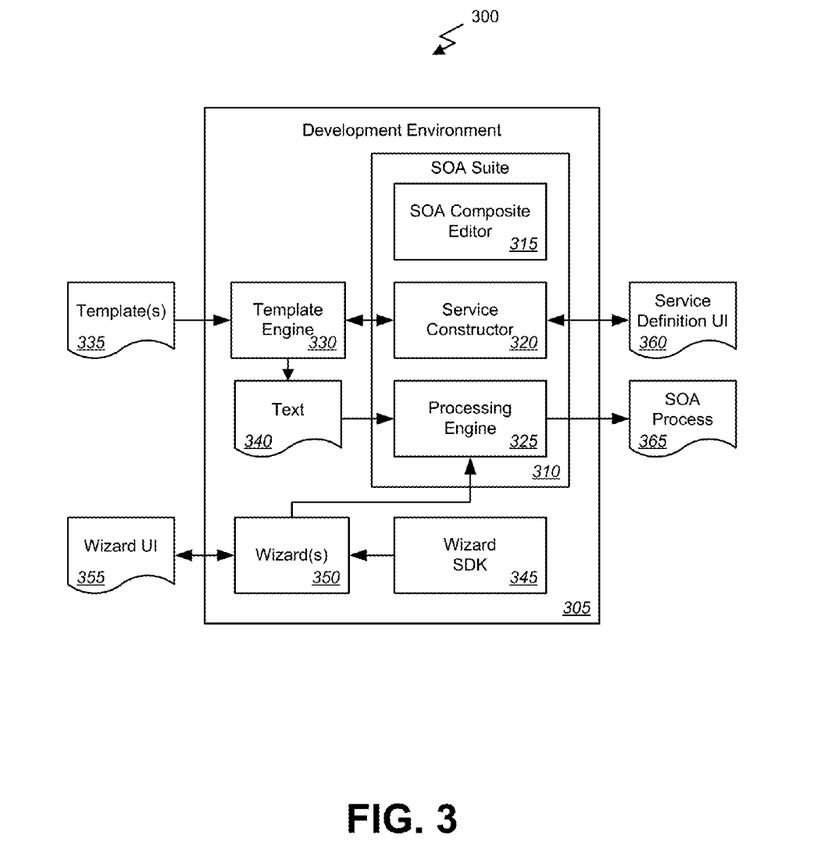
FIG. 3 is a block diagram illustrating, at a high-level, functional components of a system for supporting definition of services in a Service Oriented Architecture (SOA) according to one embodiment of the present invention.

FIG. 3 is a block diagram illustrating, at a high-level, functional components of a system for supporting definition of services in a Service Oriented Architecture (SOA) according to one embodiment of the present invention. In this example, the system 300 includes a development environment 305 executing on one or more computer systems such as any of the servers or other systems described above. For example, the development environment 305 can comprise JDeveloper or another such environment. The development environment 305 can include a SOA suite 310 with a SOA composite editor 315 for use by developers to create SOA processes. The SOA suite 310 can also include a service constructor 320. The service constructor 320 can comprise a wizard that can be used by a solution architect to define services e.g., define overall service and for overall service define tasks and for tasks define component requirements etc.

The development environment 305 can also include a template engine 330 that helps developers create services according to prescribed patterns, e.g., naming conventions etc. defined in a set of one or more templates 335. Template engine 330 can use the definitions from the templates 335 to write out text files 340, for example as Business Process Execution Language (BPEL) code, that can be opened in the SOA suite 310. Generally speaking, a template 335 can be bootstrap code for another SOA project. When a new project is created using a template 335, the template code can be copied and the user can further edit or extend his newly created project, for example through a service definition user interface 360 presented by the SOA suite 310. Note that changes to the template 335 need not be propagated to projects consuming those templates. Rather, the templates aid productivity instead of rendering common behavior or a form of inheritance.

A given template 335 can be an entire SOA composite, a SCA component, or a fragment of code. These different template types can be created at any point during the project. Each template 335 can include definitions of the process, task, component, etc. with variables identified for some attributes. As will be described below, values for these variables can be set based on information collected from the developer at runtime when the template 335 is used in the development environment 305. Each template 335 can also include a manifest explaining what the template is and what it might be used for. A template defining a component can also define dependencies for that component and package those as part of the template. A template defining a process can also define dependencies and what components are within the scope and not within the scope of that process. Once template is packaged and developer wants to use it (e.g., a graphical representation of that template is dragged from a palette onto a canvas for the project represented in the service definition user interface 360) a check can be performed on dependencies defined in that template to assure no collisions etc. based on use of the template in that process.

Embodiments of the present invention also provide a way to interject into the template creation process and associate a wizard 350 to the template. For example, a developer can uses a wizard SDK 345 of the development environment 305 to create and attach a wizard 350 to a particular template 335 or set of templates. A wizard 350 can include a defined interface 355 with a definition of variables within the associated template 335 to be set for a particular use case, i.e., based on the use of the template within the process definition. It should be noted that while illustrated here for the sake of clarity as being separate from the service definition user interface 360, the wizard interface may in practice be presented in the same interface, e.g., as a pop up or other element in the service definition user interface 360.

Subsequently, when a template 335 is used at runtime of the SOA composite editor 315, the associated wizard can then be used to guide the developer through defining values for variables identified in the template according to rules for particular use cases being defined (formats, naming conventions, etc.) also defined in the template. For example, the SOA composite editor 315 detects whether there is a template selected. If so, the SOA composite editor 315 detects whether there is a wizard attached. If so, the SOA composite editor 315 can read the set of variables of the template and fill the values for those variables via a set of questions presented to the user/developer by the associated wizard 350. So in other words, the wizard 350 provides functions of the SOA composite editor 315 API but without directly exposing that API. Rather, the wizard interface 355 is a more abstract interface to the template 335 and does not require the wizard 350 to parse the template. Rather, the wizard 350 uses the definition for that template 335 that identifies the variables therein.

Values for the variables defined in the template 335 can then be populated by the wizard 350 (based on input from the user through wizard Q&A etc.) and when the wizard releases control, the processing engine can use the values and text 340 from the template engine to generate text of code 365 (e.g., BPEL or other code) defining the SOA process. That is, the processing engine 325 can fill the variable values of the template 335 with wizard results and place the filled template in the process definitions (BPEL) 365 where the user has indicated (e.g., by a drag and drop operation from a palette onto a canvas within the service definition user interface 360).

In summary, a developer or other user can create and register a wizard 350 associated with a template 335 to be invoked when the template 335 is used at runtime of the development environment 305 as part of a process of generating a process definition 365. The template 335 itself can have declared values so that when the wizard 350 is invoked there is a set of variables in the template 335 that the wizard can change. The wizard collects values for these variables from the developer, for example through a defined interface 355 which may include a question and answer session or other interaction with the developer. Once control is released by the wizard 350, the processing engine 325 can use those values collected from the developer to update the defined variables in the template code. The updated template code can then be merged into the process definition 365 (code for the service). So in other words, the "what" of a service definition can be defined by a solution architect and communicated to a developer through the templates 335 and service constructor 320. The "how" of the service can be driven by the template engine 330 and implementation details can be gathered from the developer through the wizard 350. The wizard UI 355 comes in based on the selected template 335 which assists the developer to provide the appropriate attributes. Once the attributes are provided, the template engine 330 handles the proper creation of artifacts that conform to the standards.

Stated another way, supporting definition of a service can comprise defining and storing a plurality of templates 335. Each template 335 can comprise code defining a process, a task, or a component available for use in one or more services. The code can include one or more variables. One or more wizards 350 can also be defined and stored. Each wizard 355 can comprise a routine presenting a defined interface 355 and directing definition of values for variables within one or more of the plurality of templates 335. The one or more wizards 350 can be associated with one or more of the plurality of templates 335.

At runtime of the development environment 305 a selection of a template 335 of the plurality of templates can be received, for example by the developer dragging and dropping or otherwise manipulating a graphical or other representation of the template in the service definition user interface 360 of the development environment. The selection can indicate use of the template in the definition of the service. A determination can be made as to whether the selected template 335 is associated with a wizard 350 of the one or more wizards. In response to determining the selected template 335 is associated with a wizard 350 of the one or more wizards, the associated wizard 350 can be invoked. The variables of the selected template 335 can be filled with values collected through the defined interface 355 of the invoked wizard 350 and based on the routine of the invoked wizard 350.

A determination can be made as to whether the invoked wizard 350 has completed collecting values for the variables defined in the template 335. Upon completion of the wizard 350, the text 340 of the template can be updated with the filled variable values and the updated text 340 of the template 335 can be inserted into code 365 for the definition of the service. Optionally, the code 365 for the definition of the service including the inserted updated text 340 of the template 335 can be presented to a user of the development environment 305.

In response to determining the selected template 335 is not associated with a wizard 350 of the one or more wizards, the text 340 of the selected template 335 can be inserted into code 365 for the definition of the service. Optionally, the code 365 for the definition of the service including the inserted text 340 of the template 335 can be presented to a user of the development environment 305.

Figure 4A:
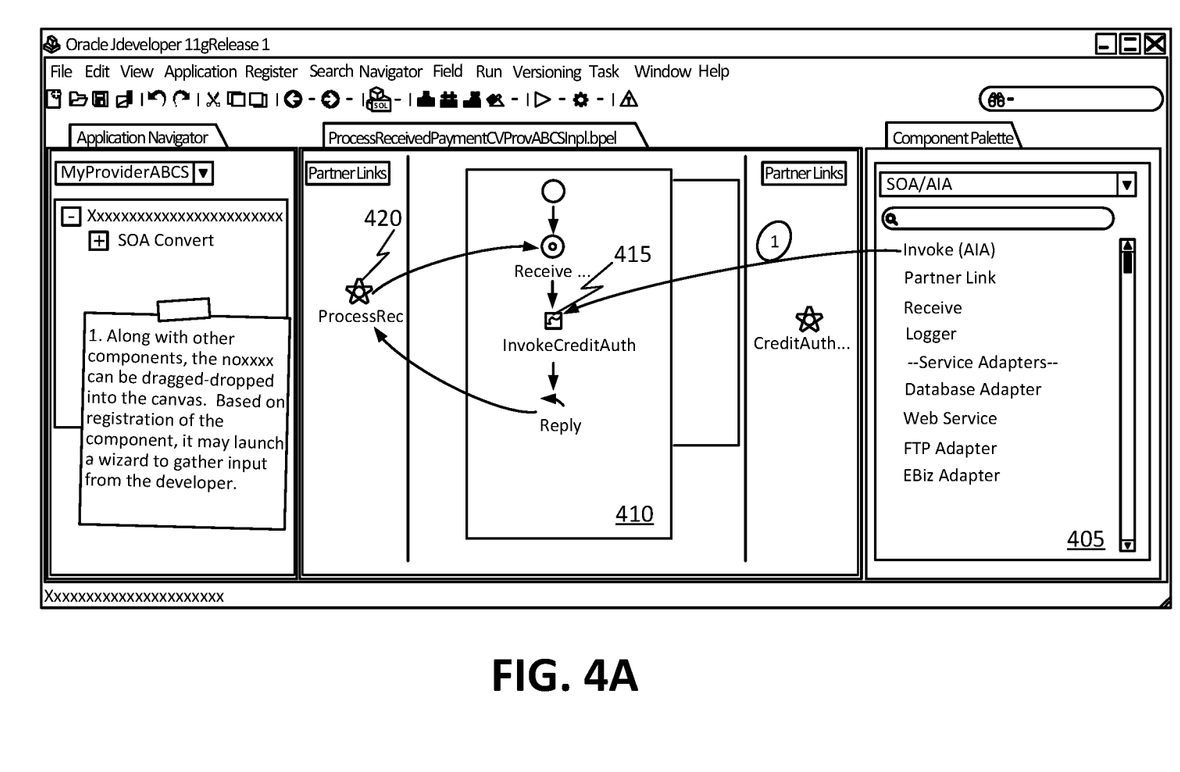
FIGS. 4A and 4B illustrate exemplary user interfaces for a development environment supporting definition of services in a Service Oriented Architecture (SOA) according to one embodiment of the present invention.
Figure 4B:
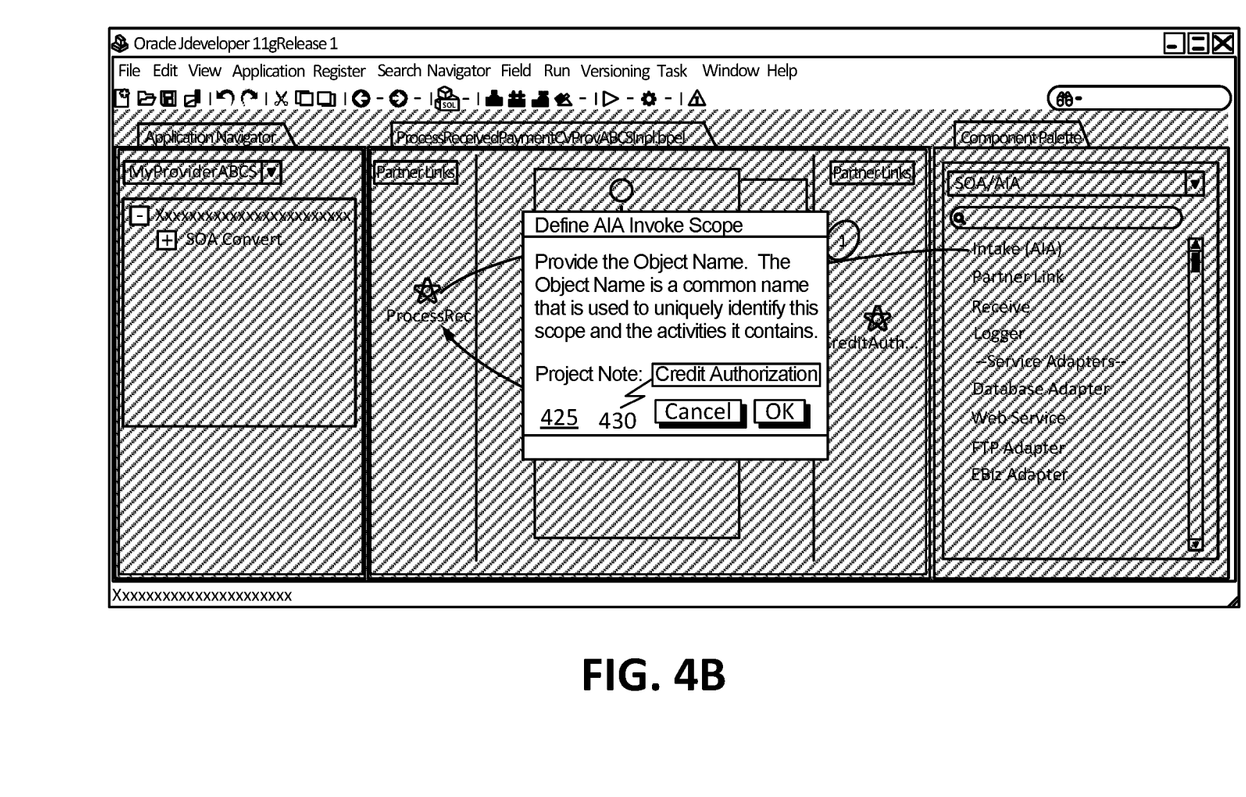

FIGS. 4A and 4B illustrate exemplary user interfaces for a development environment supporting definition of services in a Service Oriented Architecture (SOA) according to one embodiment of the present invention. More specifically, these examples illustrate one possible implementation of the service definition user interface 360 described above. However, it should be understood that the interfaces illustrated and described here are offered only by way of example and are not intended to limit the scope of the present invention. Rather, depending upon the exact implementation, the contents and format of the user interfaces can vary significantly without departing from the scope of the present invention.

As illustrated in the example of FIG. 4A, the interface 400 can comprise a page such as a web page through which the developer can interact with the development environment. For example, this interface 400 can include a palette 405 of templates or other objects that may be selected by the developer for use in the project. Upon a selection, for example by the developer clicking and dragging and then dropping a graphical representation 415 one of the templates onto a canvas 410 representing the process and in a location in the flow of the process in which the developer intends to add the component represented by that template. If there is a wizard 420 associated with the selected template, that wizard can be launched. As illustrated in FIG. 4B, launching the wizard may cause a wizard interface 425 such as a pop-up window or other element to open. Through the wizard interface 425, the developer can enter or otherwise indicate values for variables defined in the selected template. Upon completion, the wizard can then update the template with the entered variable values.

Figure 5:
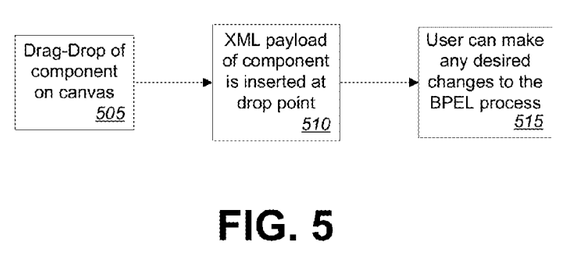
FIG. 5 is a flowchart illustrating an exemplary use case of a service definition user interface according to one embodiment of the present invention.

FIG. 5 is a flowchart illustrating an exemplary use case of a service definition user interface according to one embodiment of the present invention. More specifically, this example illustrates a use case in which there is no wizard associated with a particular, selected template. In this case, the developer drags 505 a template onto the canvas. The snippet of code from the selected template and using generic attributes can be included 510 in the process definition at the drop-point. The developer may then use 515 the standard editing capabilities of the development environment on the dropped snippet of code.

Figure 6:
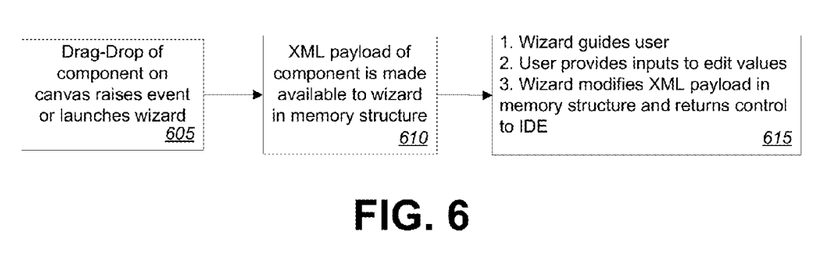
FIG. 6 is a flowchart illustrating another exemplary use case of a service definition user interface according to one embodiment of the present invention.

FIG. 6 is a flowchart illustrating another exemplary use case of a service definition user interface according to one embodiment of the present invention. More specifically, this example illustrates a use case in which there is a wizard associated with a particular, selected template. In this case, the developer can drag and drop 610 a template onto the canvas representing the process. The selection of this template, i.e., the drag and drop, should raise an event or allow the invocation 610 of the associated wizard. Code of the selected template can be made available in a memory structure for the wizard to review and manipulate. The wizard can guide 615 the developer for defining values for the variables of the template code. Once complete, the modified template code, i.e., with the specified values inserted for the variables, can be included into the overall code for the process.

Figure 7:
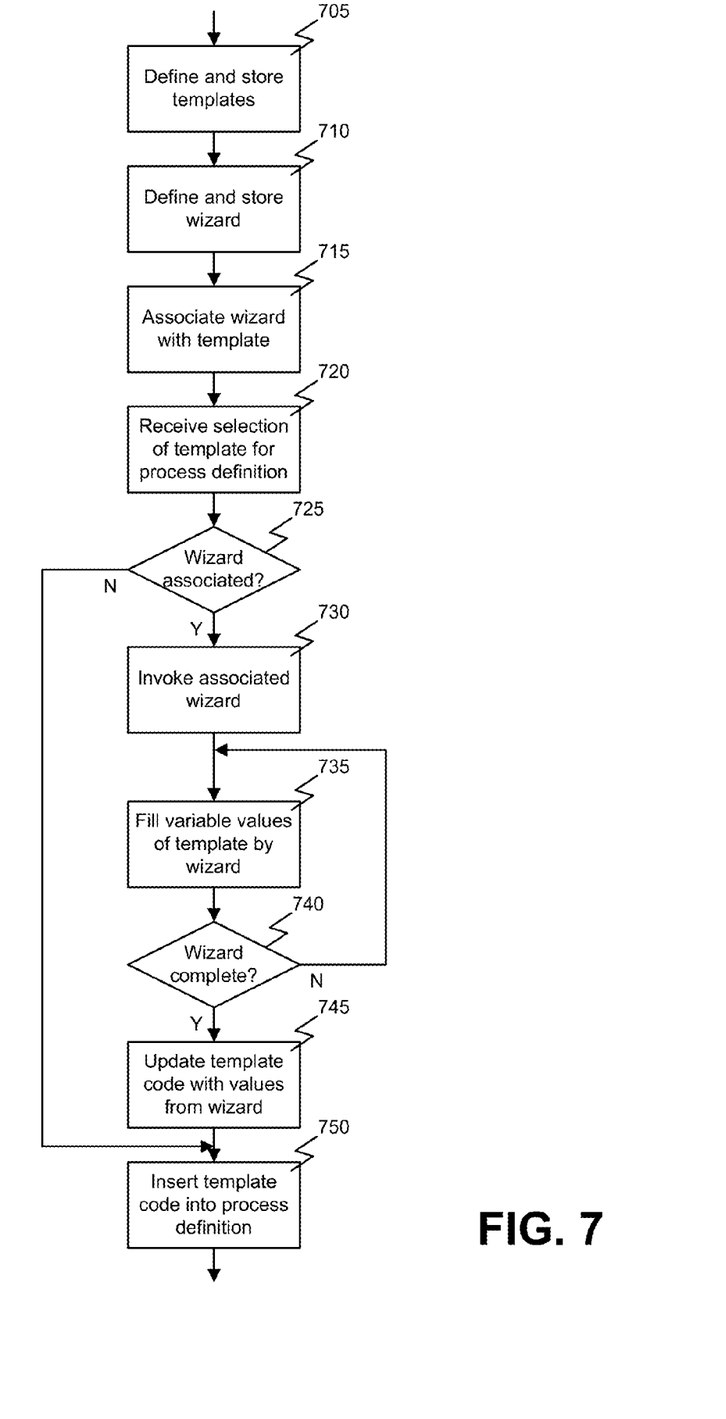
FIG. 7 is a flowchart illustrating a process for supporting definition of services in a Service Oriented Architecture (SOA) according to one embodiment of the present invention.

FIG. 7 is a flowchart illustrating a process for supporting definition of services in a Service Oriented Architecture (SOA) according to one embodiment of the present invention. In this example, processing begins with defining 705 and storing a plurality of templates. Each template can comprise code defining a process, a task, or a component available for use in one or more services. The code can include one or more variables. One or more wizards can also be defined 710 and stored. Each wizard can comprise a routine presenting a defined interface and directing definition of values for variables within one or more of the plurality of templates. The one or more wizards can be associated 715 with one or more of the plurality of templates.

At runtime of the development environment a selection of a template of the plurality of templates can be received 720, the selection indicating use of the template in the definition of the service. A determination 725 can be made as to whether the selected template is associated with a wizard of the one or more wizards. In response to determining 725 the selected template is associated with a wizard of the one or more wizards, the associated wizard can be invoked 730. The variables of the selected template can be filled 735 with values collected through the defined interface of the invoked wizard and based on the routine of the invoked wizard.

A determination 740 can be made as to whether the invoked wizard has completed collecting values for the variables defined in the template. Upon completion of the wizard, the code of the template can be updated 745 with the filled variable values and the updated code of the template can be inserted 750 into code for the definition of the service. Optionally, the code for the definition of the service including the inserted updated code of the template can be presented to a user of the development environment.

In response to determining 725 the selected template is not associated with a wizard of the one or more wizards, the code of the selected template can be inserted 750 into code for the definition of the service. Optionally, the code for the definition of the service including the inserted code of the template can be presented to a user of the development environment.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for supporting definition of services in a Service Oriented Architecture (SOA), the method comprising:
    defining a plurality of templates according to a project checklist model, each template comprising:
        a manifest explaining what the template is and what it can be used for,
        code defining a business process available for use in one or more services, the code including one or more variables,
        definitions of dependencies for the business process defined by the template, the definition of dependencies including one or more components from a plurality of components that are within a scope of the business process defined by the template, and
        a set of rules including a format rule and a naming convention rule to be applied to values for the one or more variables;
    defining a plurality of wizards, each wizard defined based on one of the plurality of templates, each wizard comprising:
        an executable routine providing one or more functions of a SOA composite editor including presenting a defined interface for defining values for the one or more variables within the code of the one of the plurality of templates upon which the wizard definition is based, and
        code for guiding a developer through definition of the values for the one or more variables according to the set of rules for the one of the plurality of templates upon which the wizard definition is based;
    associating each wizard of the plurality of wizards with the one of the plurality of templates upon which the wizard definition is based by adding the associated wizard to the definition of the one of the plurality of templates;
    executing the SOA composite editor to define a service;
    receiving at runtime of the SOA composite editor a selection of a first template of the plurality of templates and a location in a code for the definition of the service;
    identifying a first associated wizard based on the first template, the first associated wizard being associated with the first template in the definition of the first template;
    receiving, from the first associated wizard, a first set of values, each value from the first set of values assigned to one of the one or more variables within the code of the first template, the first set of values complying with the set of rules for the first template;
    updating the code of the first template with the first set of values; and
    inserting the updated code of the first template into the code for the definition of the service at the location.

2. The method of claim 1, further comprising:
    receiving at runtime of the SOA composite editor a selection of a second template of the plurality of templates and a second location in the code for the definition of the service; and
    determining the second template is defined without an associated wizard.

3. The method of claim 2, further comprising:
    inserting a code of the second template into the code for the definition of the service at the second location.

4. The method of claim 3, wherein the code of the second template contains a default value for one of the one or more variables defined within the code of the second template.

5. The method of claim 1, further comprising presenting to a user of the SOA composite editor the code for the definition of the service including the inserted updated code of the first template.

6. The method of claim 4, further comprising presenting to a user of the SOA composite editor the code for the definition of the service including the inserted updated code of the first template and the inserted code of the second template.

7. The method of claim 1, further comprising checking the defined dependencies for the business process defined by the first template to ensure there are no collisions based on use of the first template in the definition of the service.

8. A system comprising:
    a processor; and
    a memory coupled with and readable by the processor and storing a set of instructions which, when executed by the processor, causes the processor to support definition of services in a Service Oriented Architecture (SOA) by:
        defining a plurality of templates according to a project checklist model, each template comprising:
            a manifest explaining what the template is and what it can be used for,
            code defining a business process available for use in one or more services, the code including one or more variables,
            definitions of dependencies for the business process defined by the template, the definition of dependencies including one or more components from a plurality of components that are within a scope of the business process defined by the template, and
            a set of rules including a format rule and a naming convention rule to be applied to values for the one or more variables;
        defining a plurality of wizards, each wizard defined based on one of the plurality of templates, each wizard comprising:
            an executable routine providing one or more functions of a SOA composite editor including presenting a defined interface for defining values for the one or more variables within the code of the one of the plurality of templates upon which the wizard definition is based, and
            code for guiding a developer through definition of the values for the one or more variables according to the set of rules for the one of the plurality of templates upon which the wizard definition is based;
        associating each wizard of the plurality of wizards with the one of the plurality of templates upon which the wizard definition is based by adding the associated wizard to the definition of the one of the plurality of templates;

executing the SOA composite editor to define a service;
receiving at runtime of the SOA composite editor a selection of a first template of the plurality of templates and a location in a code for the definition of the service;
identifying a first associated wizard based on the first template, the first associated wizard being associated with the first template in the definition of the first template;
receiving, from the first associated wizard, a first set of values, each value from the first set of values assigned to one of the one or more variables within the code of the first template, the first set of values complying with the set of rules for the first template;
updating the code of the first template with the first set of values; and
inserting the updated code of the first template into the code for the definition of the service at the location.

9. The system of claim 8, further comprising:
receiving at runtime of the SOA composite editor a selection of a second template of the plurality of templates and a second location in the code for the definition of the service; and
determining the second template is defined without an associated wizard.

10. The system of claim 9, further comprising:
inserting a code of the second template into the code for the definition of the service at the second location.

11. The system of claim 10, wherein the text of the second template contains a default value for one of the one or more variables defined within the code of the second template.

12. The system of claim 8, further comprising presenting to a user of the SOA composite editor the code for the definition of the service including the inserted updated code of the first template.

13. The system of claim 11, presenting to a user of the SOA composite editor the code for the definition of the service including the inserted updated code of the first template and the inserted code of the second template.

14. The system of claim 8, further comprising checking the defined dependencies for the business process defined by the first template to ensure there are no collisions based on use of the first template in the definition of the service.

15. A non-transitory computer-readable medium comprising a set of instructions stored therein which, when executed by a processor, cause the processor to support definition of services in a Service Oriented Architecture (SOA) by:
defining a plurality of templates according to a project checklist model, each template comprising:
a manifest explaining what the template is and what it can be used for,
code defining a business process available for use in one or more services, the code including one or more variables, and
definitions of dependencies for the business process defined by the template, the definition of dependencies including one or more components from a plurality of components that are within a scope of the business process defined by the template, and
a set of rules including a format rule and a naming convention rule to be applied to values for the one or more variables;
defining a plurality of wizards, each wizard defined based on one of the plurality of templates, each wizard comprising:
an executable routine providing one or more functions of a SOA composite editor including presenting a defined interface for defining values for the one or more variables within the code of the one of the plurality of templates upon which the wizard definition is based, and
code for guiding a developer through definition of the values for the one or more variables according to the set of rules for the one of the plurality of templates upon which the wizard definition is based;
associating each wizard of the plurality of wizards with the one of the plurality of templates upon which the wizard definition is based by adding the associated wizard to the definition of the one of the plurality of templates;
executing the SOA composite editor to define a service;
receiving at runtime of the SOA composite editor a selection of a first template of the plurality of templates and a location in a code for the definition of the service;
identifying a first associated wizard based on the first template, the first associated wizard being associated with the first template in the definition of the first template;
receiving, from the first associated wizard, a first set of values, each value from the first set of values assigned to one of the one or more variables within the code of the first template, the first set of values complying with the set of rules for the first template;
updating the code of the first template with the first set of values; and
inserting the updated code of the first template into the code for the definition of the service at the location.

16. The non-transitory computer-readable medium of claim 15, further comprising:
receiving at runtime of the SOA composite editor a selection of a second template of the plurality of templates and a second location in the code for the definition of the service; and
determining the second template is defined without an associated wizard.

17. The non-transitory computer-readable medium of claim 16, further comprising:
inserting a code of the second template into the code for the definition of the service at the second location.

18. The non-transitory computer-readable medium of claim 17, wherein the code of the second template contains a default value for one of the one or more variables defined within the code of the second template.

19. The non-transitory computer-readable medium of claim 15, further comprising presenting to a user of the SOA composite editor the code for the definition of the service including the inserted updated code of the first template.

20. The non-transitory computer-readable medium of claim 18, further comprising presenting to a user of the SOA composite editor the code for the definition of the service including the inserted updated code of the first template and the inserted code of the second template.

21. The method of claim 1, wherein the business process definition comprises a Business Process Execution Language (BPEL) definition.

22. The method of claim 1, wherein the project checklist model comprises a plurality of phases of a development project, provides guidance through the plurality of phases of the development project, and provides linking to one or more tools in one or more of the plurality of phases.

23. The method of claim 22, wherein the first template further defines the scope of the business process defined by the first template within one or more phases of the plurality of phases of the development project.

* * * * *